(12) United States Patent
Nakashima et al.

(10) Patent No.: US 11,123,868 B2
(45) Date of Patent: Sep. 21, 2021

(54) ROBOT SYSTEM

(71) Applicant: NACHI-FUJIKOSHI CORP, Tokyo (JP)

(72) Inventors: Hiroyuki Nakashima, Toyama (JP); Masayasu Futagawa, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 144 days.

(21) Appl. No.: 16/610,328

(22) PCT Filed: Apr. 24, 2018

(86) PCT No.: PCT/JP2018/016576
§ 371 (c)(1),
(2) Date: Nov. 1, 2019

(87) PCT Pub. No.: WO2018/203492
PCT Pub. Date: Nov. 8, 2018

(65) Prior Publication Data
US 2020/0078942 A1 Mar. 12, 2020

(30) Foreign Application Priority Data
May 3, 2017 (JP) .............................. JP2017-092029

(51) Int. Cl.
*B25J 9/16* (2006.01)
*B25J 9/00* (2006.01)
*B25J 9/04* (2006.01)

(52) U.S. Cl.
CPC ........... *B25J 9/1664* (2013.01); *B25J 9/0021* (2013.01); *B25J 9/04* (2013.01); *B25J 9/1651* (2013.01)

(58) Field of Classification Search
CPC . B25J 9/0021; B25J 9/04; B25J 9/1651; B25J 9/1664; B25J 9/1676; B25J 19/06; G05B 2219/37297
See application file for complete search history.

(56) References Cited

U.S. PATENT DOCUMENTS

2014/0379128 A1* 12/2014 Ishikawa ................ B25J 9/1674
700/250
2015/0177084 A1* 6/2015 Inoue ........................ G01L 5/18
73/862.541

FOREIGN PATENT DOCUMENTS

JP 7-337055 A 12/1995
JP 9-222910 A 8/1997
(Continued)

OTHER PUBLICATIONS

International Search Report for International Application No. PCT/JP2018/016576 dated Jul. 31, 2018.

*Primary Examiner* — Dale Moyer
(74) *Attorney, Agent, or Firm* — Venkatesh Krishnamoorthy; Silicon Valley Patent Group, LLP (57) ABSTRACT

Provided is a robot system that can accurately sense contact between an arm of a robot or an instrument attached to the arm and another object. The robot system includes: a robot main body 22 and a robot control unit 21, the robot main body 22 including: a motor 8; a deceleration device 19 connected to a motor shaft 17 of the motor 8; an arm 15 connected to an output shaft 16 of the deceleration device 19; a motor shaft-side angular sensor 1 capable of detecting an angle of rotation of the motor shaft 17 of the motor 8; and an output shaft-side angular sensor 2 capable of detecting an angle of rotation of the output shaft 16 of the deceleration device 19, and the robot control unit 21 being configured to detect a contact state between the arm 15 or an instrument attached to the arm 15 and another object, based on a motor (Continued)

shaft-side rotation angle detected by the motor shaft-side angular sensor 1, an output shaft-side rotation angle detected by the output-side angular sensor 2, and an angular sensor misalignment correction value for the motor shaft-side angular sensor 1 and the output shaft-side angular sensor 2.

4 Claims, 7 Drawing Sheets

(56) References Cited

FOREIGN PATENT DOCUMENTS

| | | | |
|---|---|---|---|
| JP | 2003-39376 A | | 2/2003 |
| JP | 2010-228028 A | | 10/2010 |
| JP | 2010269412 A | * | 12/2010 |
| JP | 2013198955 A | * | 10/2013 |
| JP | 2015-3357 A | | 1/2015 |
| JP | 2015-145045 | | 8/2015 |
| JP | 2016-221615 A | | 12/2016 |

* cited by examiner

FIG. 7 ately sensing contact between an arm of a robot or an
ROBOT SYSTEM

CROSS-REFERENCE TO RELATED APPLICATIONS

This application is a National Stage Application, under 35 U.S.C. § 371, of International Application No. PCT/JP2018/016576 filed Apr. 24, 2018, which claims priority to Japanese Patent Application No. 2017 092029 filed May 3, 2017. The above-identified applications are incorporated by reference herein in their entireties.

TECHNICAL FIELD

The present invention relates to a robot system for accurately sensing contact between an arm of a robot or an instrument attached to the arm and another object.

BACKGROUND

Conventionally, a variety of robots have been used in factories and the like. Even now, robots are being actively developed for the purpose of improving positioning accuracy, safety, and the like. Also, articulated robots for performing more complex movement, and the like have come into practical use and are widespread.

In articulated robots that perform complex movement as described above, a technique for detecting that an arm portion or the like has been brought into contact with a structural object, a workpiece, an operator or the like to reduce accidents that may be caused by the contact is important. Conventionally, a variety of techniques for detecting contact between a robot and another object have been proposed.

For example, Patent Document 1 has proposed a technique for detecting a collision of an arm of a horizontally articulated robot by comparing and monitoring signals output from two encoders provided on the arm, the encoders being configured to detect relative rotation angles.

Also, Patent Document 2 has proposed a technique for determining whether or not a collision has occurred, by providing encoders (angle detecting means) on input and output sides of a deceleration device mounted on a joint of a robot arm, and calculating an error in the joint based on an angular difference between an input-side rotation angle and an output-side rotation angle.

Related Documents

Patent Document 1: Japanese Patent Application No. JP 2003-39376A
Patent Document 2: Japanese Patent Application No. JP 2015-3357A

Problems to be Solved

However, in the techniques described in Patent Documents 1 and 2, due to the influence of, for example, shaft center misalignment or variations in bolting torque caused when the encoders are attached, angles detected by the encoders may vary slightly from the actual values. Accordingly, the accuracy in sensing contact made by the robot arm may be reduced by the variation. The impaired accuracy may not cause a problem if a contact object to be sensed is a structural object or the like, but will cause a safety issue if the object is a person.

Furthermore, there are also methods in which, in order to detect contact made by a robot arm, a contact sensing sensor is attached to a surface of the robot arm. However, in the case of an articulated robot arm, it is not clear which portion of the robot arm will make contact, and thus a large number of sensors need to be attached, leading to the problem of increased manufacturing cost.

The present invention has been proposed to solve the problems as described above, and it is an object thereof to provide a robot system that can improve reliability, economic efficiency, and the like in sensing contact with another object including a person, and can reduce damage that may be caused by accidental contact.

SUMMARY

In order to achieve the aforementioned objects, the robot system according to the present invention at least includes a robot main body and a robot control unit, the robot main body including a motor; a deceleration device connected to a motor shaft of the motor; an arm connected to an output shaft of the deceleration device; a motor shaft-side angular sensor capable of detecting an angle of rotation of the motor shaft of the motor; and an output shaft-side angular sensor capable of detecting an angle of rotation of the output shaft of the deceleration device, the robot control unit being configured to detect a contact state between the arm or an instrument attached to the arm and another object.

The robot control unit includes: an angular sensor misalignment correction value storage unit in which an angular sensor misalignment correction value is stored, the angular sensor misalignment correction value being calculated based on an amount of misalignment when the motor shaft-side angular sensor and the output shaft-side angular sensor are attached; a motor shaft-side angle calculation unit configured to calculate a motor shaft-side angle based on the angle of rotation on the motor shaft side; an output shaft-side angle calculation unit configured to calculate an output shaft-side angle based on the angle of rotation on the output shaft side; a torsional deformation amount calculation unit configured to calculate an angular difference between the motor shaft-side angle and the output shaft-side angle, and correct the calculated angular difference using the angular sensor misalignment correction value to obtain a torsional deformation amount; a spring constant storage unit in which a spring constant of a region from the motor to the arm is stored; a contact determination threshold storage unit in which an allowable contact torque of the arm is stored; and a contact determination unit configured to calculate contact torque of the arm based on the torsional deformation amount and the spring constant stored in the spring constant storage unit, and detect the contact state when the calculated contact torque is larger than the allowable contact torque stored in the contact determination threshold storage unit.

The robot control unit may further include a motor control instruction unit configured to stop the motor when the contact state is sensed by the contact determination unit.

Furthermore, the robot control unit may further include a contact response gain storage unit in which a gain of the arm that responds to the contact torque is stored; and a motor control instruction unit configured to drive the motor at the speed obtained by multiplying a difference between the contact torque and the allowable contact torque by the gain, when the contact state is sensed by the contact determination unit.

Effects of the Inventions

According to the robot system of the present invention, it is possible to improve reliability and economic efficiency in sensing contact with another object. Furthermore, the contact sensing accuracy can be improved compared to that of conventional robot systems, thus realizing a reduction in damage that may be caused by accidental contact.

INDEX TO THE REFERENCE NUMERALS

An index to the reference numerals used in the description follows:
1 . . . motor shaft-side angular sensor (encoder);
2 . . . output shaft-side angular sensor (encoder);
3 . . . motor shaft-side angle calculation unit;
4 . . . output shaft-side angle calculation unit;
5 . . . torsional deformation amount calculation unit;
6 . . . contact determination unit;
7 . . . motor control instruction unit;
8 . . . motor;
9 . . . angular sensor misalignment correction value storage unit;
10 . . . spring constant storage unit;
11 . . . contact determination threshold storage unit;
12 . . . contact response gain storage unit;
15 . . . arm;
16 . . . output shaft of a deceleration device 18;
17 . . . motor shaft of the motor 8;
18 . . . deceleration device;
20 . . . robot system;
21 . . . robot control unit;
22 . . . robot main body.

DETAILED DESCRIPTION

Figure 1:
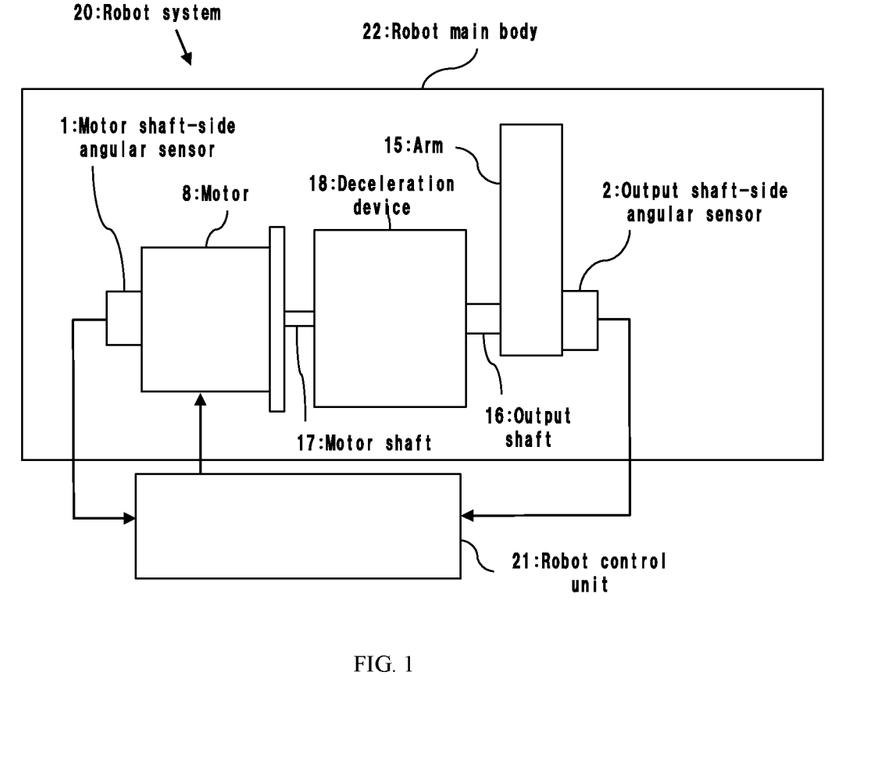
FIG. 1 is a schematic view illustrating a robot system 20 according to the present invention.

FIG. 1 is a schematic view showing a main part of a robot system 20 according to the present invention. In FIG. 1, the robot system 20 of the present embodiment includes a motor 8, a deceleration device 18, an arm 15, a motor shaft-side angular sensor 1 for a motor shaft, an output shaft-side angular sensor 2 for an output shaft, and a robot control unit 21. The arm 15 is coupled to the motor 8 with the deceleration device 18 interposed therebetween, and thus when the motor 8 is driven and rotated, the arm 15 will rotate. Note that the robot system 20 of the present embodiment has a configuration including one motor, one deceleration device, one motor shaft-side angular sensor, one output shaft-side angular sensor, and one arm. However, the present invention is not limited to the example embodiment above, and the robot system may also have a configuration including a plurality of motors, a plurality of deceleration devices, a plurality of motor shaft-side angular sensors, a plurality of output shaft-side angular sensors, and a plurality of arms.

Typically, a servomotor or the like is used as the motor 8. Also, on one end side of the motor 8, one end of a motor shaft 17 is connected to an input shaft of the deceleration device 18, and on the other end of the motor 8, the motor shaft-side angular sensor 1 for the motor shaft is attached.

In the present embodiment, an encoder is used as the motor shaft-side angular sensor 1 for the motor shaft, and the encoder is configured to detect the rotation direction and the rotation angle of the motor shaft 17 of the motor 8, and output a measurement signal to the robot control unit 21. Note that the motor shaft-side angular sensor 1 is fixed to the motor shaft 17, but due to the inevitable influence of a processing accuracy limit or attachment accuracy for example, the shaft center of the motor shaft-side angular sensor 1 may be misaligned with the shaft center of the motor shaft 17.

The deceleration device 18 is constituted by a plurality of gear wheels (not shown), an output shaft 16, and the like. The arm 15 is coupled to this output shaft 16, and the output shaft-side angular sensor 2 for the output shaft is attached to an end of the output shaft 16. Note that, for example, a strain wave gearing, which is predominantly subject to elastic torsional deformation, is used as the deceleration device 18. However, the present invention is not limited to the above embodiment, and may also employ another type of deceleration device that has elastic torsional deformation between the output shaft and the input shaft.

In the present embodiment, the output shaft-side angular sensor 2 for the output shaft is also an encoder. The output shaft-side angular sensor 2 detects the rotation direction and the rotation angle of the output shaft 16, and outputs a measurement signal to the robot control unit 21. Note that the output shaft-side angular sensor 2 is fixed to the output shaft 16, but due to an inevitable influence of a processing accuracy limit or attachment accuracy for example, the shaft center of the output shaft-side angular sensor 2 may be misaligned with the shaft center of the output shaft 16.

The arm 15 has a predetermined length, and is provided with, at the leading end thereof, a tool, a workpiece holding means, or the like, which is not shown.

Figure 3:
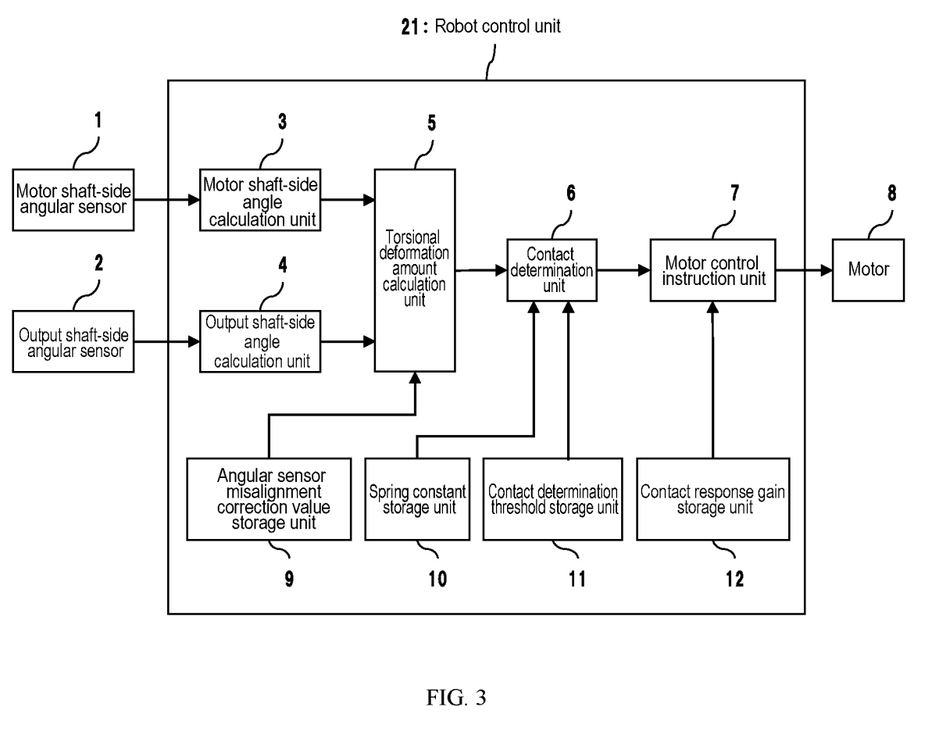
FIG. 3 is a functional block diagram illustrating a control system (robot control unit 21) of the robot system 20 according to the present invention.

FIG. 3 is a functional block diagram illustrating a control system (robot control unit 21) of the robot system 20 according to the present invention. In FIG. 3, the robot control unit 21 includes: a motor shaft-side angle calculation unit 3; an output shaft-side angle calculation unit 4; a torsional deformation amount calculation unit 5; a contact determination unit 6; a motor control instruction unit 7; an angular sensor misalignment correction value storage unit 9; a spring constant storage unit 10; a contact determination threshold storage unit 11; and a contact response gain storage unit 12.

The motor shaft-side angle calculation unit 3 obtains a motor shaft-side rotation angle $\theta m$ based on a signal received from the motor shaft-side angular sensor 1, and calculates a motor shaft-side angle $\theta 1$ by converting the motor shaft-side rotation angle $\theta m$ into an output-side angle using the deceleration ratio N of the deceleration device 18. In other words, the motor shaft-side angle calculation unit 3 calculates $\theta 1 = \theta m \div N$. The output shaft-side angle calculation unit 4 calculates an output shaft-side angle θ2 based on a signal received from the output shaft-side angular sensor 2.

The torsional deformation amount calculation unit 5 obtains an angular difference Δθd based on the motor shaft-side angle θ1, which is the result of calculation by the motor shaft-side angle calculation unit 3, and the output shaft-side angle θ2, which is the result of calculation by the output shaft-side angle calculation unit 4. That is, Δθd=θ1-θ2 is given. Furthermore, the torsional deformation amount calculation unit 5 corrects this angular difference using an angular sensor misalignment correction value θg[θ2] stored in the angular sensor misalignment correction value storage unit 9, and obtains a torsional deformation amount Δθ. That is, calculation of Δθ=Δθd·θg[θ2] is made. Here, the angular sensor misalignment correction value θg is stored, as an array with the output shaft-side angle θ2 serving as an argument, in the angular sensor misalignment correction value storage unit 9.

Figure 2:
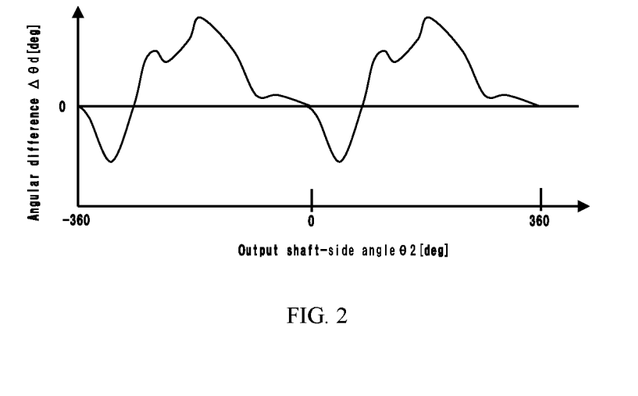
FIG. 2 is a diagram illustrating angular sensor misalignment.

Here, illustration of angular sensor misalignment is given with reference to FIG. 2. FIG. 2 is a diagram showing an angular difference when the output shaft 16 is rotated from −360 degrees to +360 degrees with the angular difference Δθd plotted on the vertical axis, and the output shaft-side angle θ2 plotted on the horizontal axis. As shown in FIG. 2, the same angular difference Δθd is observed each time the output shaft 16 is rotated 360 degrees. This is misalignment caused by shaft center misalignment between the input-side angular sensor 1 and the motor shaft 17, or between the output-side angular sensor 2 and the output shaft 16, due to an influence of processing accuracy, attachment accuracy, or the like, and is a phenomenon different from an angular transmission error inherent in the deceleration device. Due to restrictions in attaching the output shaft-side angular sensor 2, it is often the case that angular sensor misalignment actually has a value larger than the angular transmission error inherent in the deceleration device. If this misalignment is large, it is not possible to accurately measure an amount of torsional deformation that is caused by torsion due to an external force. Accordingly, it is necessary to correct the angular sensor misalignment, in order to accurately measure an amount of torsional deformation. Note that, for use as the angular sensor misalignment correction value, the relationship between the angular difference Δθd and the output shaft-side angle θ2 when the motor 8 is rotated in an unloaded condition may only be measured in advance.

Referring to FIG. 3, the contact determination unit 6 calculates contact torque T of the arm 15, based on the torsional deformation amount Δθ, which is calculated by the torsional deformation amount calculation unit 5, and a spring constant K of the region from the motor 8 to the arm 15, which is stored in the spring constant storage unit 10. That is, calculation of T=Δθ×K is made. Furthermore, by comparing the contact torque T with a contact determination threshold Tc stored in the contact determination threshold storage unit 11, the contact determination unit 6 senses whether or not an external force that corresponds to contact has occurred. That is, contact is sensed if T exceeds Tc. The reason why contact torque can be calculated from the torsional deformation amount Δθ is that, if a strain wave gearing, which is predominantly subject to elastic torsional deformation, or the like is used as the deceleration device 18, the torsional deformation amount Δθ can be treated as being equivalent to an amount of torsion of the deceleration device 18.

Figure 4:
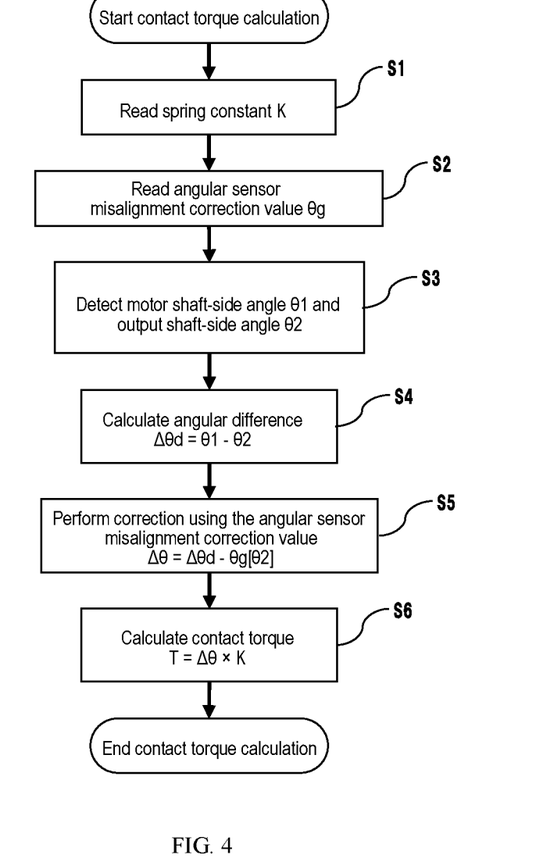
FIG. 4 is a flowchart illustrating a method of contact torque calculation that is performed by the robot system according to the present invention.

A flowchart of the contact torque calculation method is shown in FIG. 4. In step S1, the contact determination unit 6 reads the spring constant K. In step S2, the torsional deformation amount calculation unit 5 reads the angular sensor misalignment correction value θg. In step S3, the motor shaft-side angle calculation unit 3 calculates the motor shaft-side angle θ1, and the output shaft-side angle calculation unit 4 calculates the output shaft-side angle θ2. In step S4, the torsional deformation amount calculation unit 5 obtains the angular difference Δθd. That is, Δθd=θ1-θ2 is given. In step S5, the torsional deformation amount calculation unit 5 corrects this angular difference using the angular sensor misalignment correction value θg, and obtains the torsional deformation amount Δθ. In step S6, the contact determination unit 6 calculates the contact torque T of the arm 15. That is, calculation of T=Δθ×K is made.

The motor control instruction unit 7 transmits an instruction to the motor 8 according to the state of determination of contact between the arm or an instrument attached to the arm and another object, the determination being made by the contact determination unit 6. Typically, an electric current instruction to instruct the motor 8 to generate rotation torque is transmitted from the motor control instruction unit 7 of the robot control unit 21 to the motor 8 of the robot main body 22.

Figure 5:
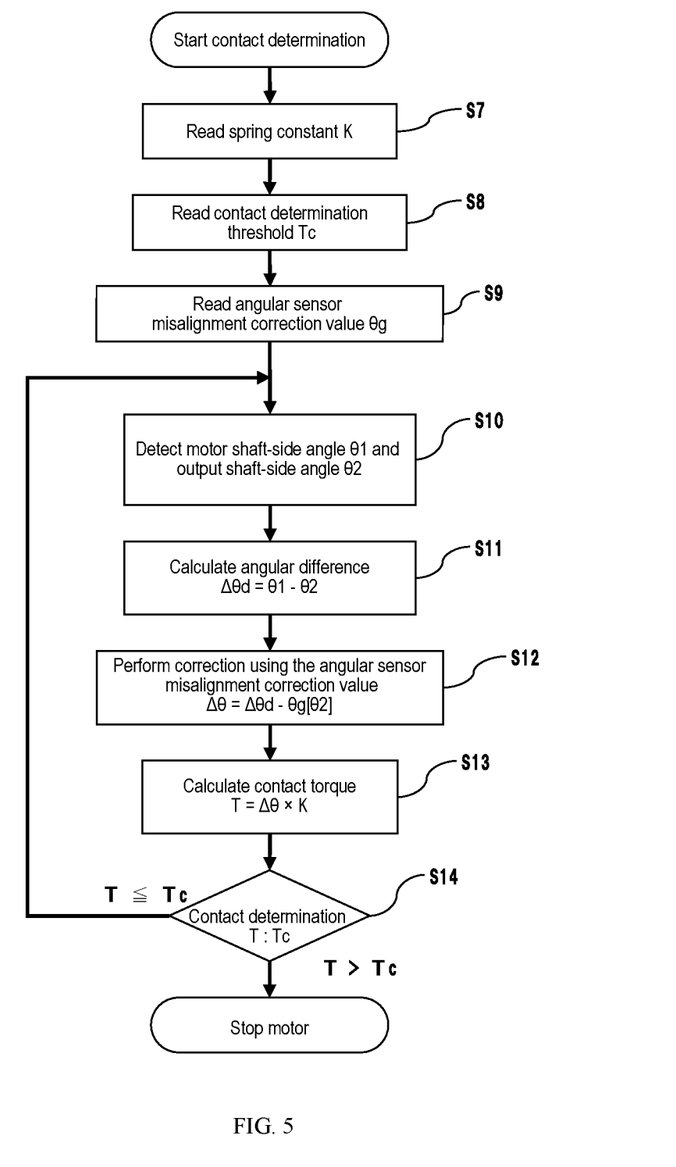
FIG. 5 is a flowchart illustrating a method of stopping the robot that is performed when contact is sensed by the robot system according to the present invention.

FIG. 5 shows a flowchart of a method in which the robot is stopped upon sensing contact between the arm or an instrument attached to the arm and another object. Steps S7, and S9 to S13 are the same as steps S1, and S2 to S6, (respectively) shown in FIG. 4. In step S8, the contact determination unit 6 reads the contact determination threshold Tc, and in step S14, the contact determination unit 6 compares the contact torque T with the calculated contact determination threshold Tc, and, if the contact torque T exceeds the contact determination threshold Tc, the motor 8 is stopped.

Figure 6:
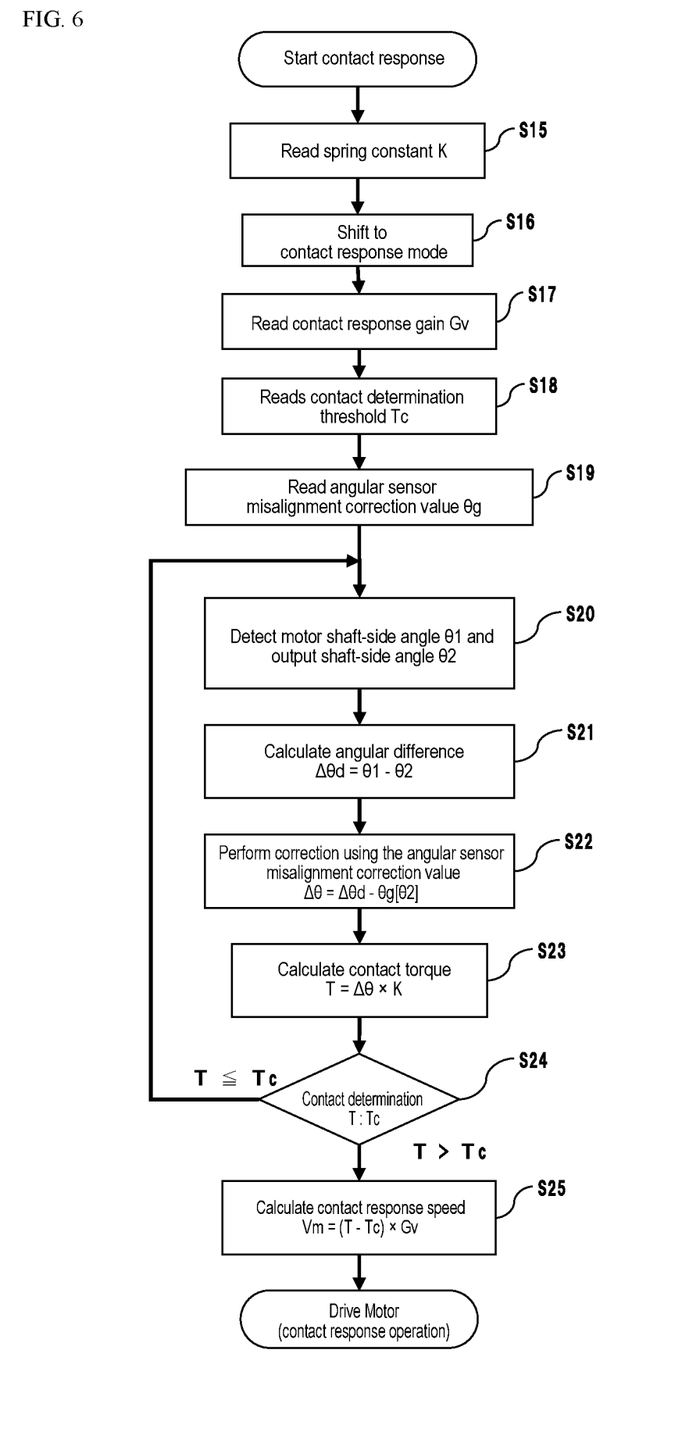
FIG. 6 is a flowchart illustrating a processing operation in which the robot responds to contact torque, the processing operation being performed by the robot system according to the present invention.

FIG. 6 shows a flowchart of a method in which, upon sensing contact between the arm or the instrument attached to the arm and another object, the robot responds to the contact torque. Steps S15, and S18 to S24 are the same as steps S7, and S8 to S14 (respectively) shown in FIG. 5. In step S16, the robot control unit 21 shifts the robot to a "contact response mode" in which the robot responds to contact torque. In step S17, the contact determination unit 6 reads a contact response gain Gv from the contact response gain storage unit 12. After having performed contact determination in step S24, the contact determination unit 6 calculates a contact response speed Vm in step S25. Vm is calculated by multiplying a difference between the contact torque T and the contact determination threshold Tc by the contact response gain Gv. That is, calculation of Vm=(T−Tc)×Gv is made. The robot control unit 21 drives the motor 8 at the calculated Vm.

A flow of angular sensor misalignment correction value measurement will be described with reference to FIG. 7. Steps S27 and S28 are the same as steps S3 and S4 (respectively) shown in FIG. 4. First, in step S26, the motor 8, which is a measurement shaft, is rotated in a state in which no load is provided on the output side of the deceleration device 18. Then, in steps S27 and S28, the torsional deformation amount calculation unit 5 calculates an angular difference Δθd. In step S29, the torsional deformation amount calculation unit 5 stores the calculated angular difference Δθd, serving as the angular sensor misalignment correction value θg, in the angular sensor misalignment correction value storage unit 9. The angular sensor misalignment correction value θg is an array θg[θ2] with the output shaft-side angle θ2 serving as an argument. The procedure from steps S26 to S29 is repeated until the output shaft-side angle θ2 is rotated more than 360 degrees, and the array θg[θ2] of the angular sensor misalignment correction value is completed.

INDUSTRIAL APPLICABILITY

The present invention is applicable to a robot system that accurately senses contact between an arm of a robot or an instrument attached to the arm and another object.

DRAWINGS

FIG. 1
1 Motor shaft-side angular sensor
2 Output shaft-side angular sensor
8 Motor
15 Arm
16 Output shaft
17 Motor shaft
18 Deceleration device
20 Robot system
21 Robot control unit
22 Robot main body FIG. 2
Y-axis Angular difference
X-axis Output shaft-side angle FIG. 3
1 Motor shaft-side angular sensor
2 Output shaft-side angular sensor
3 Motor shaft-side angle calculation unit
4 Output shaft-side angle calculation unit
5 Torsional deformation amount calculation unit
6 Contact determination unit
7 Motor control instruction unit
8 Motor
9 Angular sensor misalignment correction value storage unit
10 Spring constant storage unit
11 Contact determination threshold storage unit
12 Contact response gain storage unit FIG. 4
Start Contact Torque Calculation
S1 Read spring constant K
S2 Read angular sensor misalignment correction value θg
S3 Detect motor shaft-side angle θ1 and output shaft-side angle θ2
S4 Calculate angular difference $\Delta\theta d = \theta 1 - \theta 2$ S5 Perform correction using the angular sensor misalignment correction value $\Delta\theta = \Delta\theta d \cdot \theta g[\theta 2]$ S6 Calculate contact torque $T = \Delta\theta \times K$ End Contact Torque Calculation FIG. 5
Start Contact Determination
S7 Read spring constant K
S8 Read contact determination threshold Tc
S9 Read angular sensor misalignment correction value θg
S10 Detect motor shaft-side angle θ1 and output shaft-side angle θ2
S11 Calculate angular difference $\Delta\theta d = \theta 1 - \theta 2$ S12 Perform correction using the angular sensor misalignment correction value $\Delta\theta = \Delta\theta d \cdot \theta g[\theta 22]$ S13 Calculate contact torque $T = \Delta\theta \times K$ S14 Contact determination $T:Tc$ Stop Motor FIG. 6
Start Contact Response
S15 Read spring constant K
S16 Shift to contact response mode
S17 Read contact response gain Gv
S18 Reads contact determination threshold Tc
S19 Read angular sensor misalignment correction value θg
S20 Detect motor shaft-side angle θ1 and output shaft-side angle θ2
S21 Calculate angular difference $\Delta\theta d = \theta 1 - \theta 2$ S22 Perform correction using the angular sensor misalignment correction value $\Delta\theta = \Delta\theta d \cdot \theta g[\theta 2]$ S23 Calculate contact torque $T = \Delta\theta \times K$ S24 Contact determination $T:Tc$ S25 Calculate contact response speed $Vm = (T - Tc) \times Gv$ Drive Motor (Contact Response Operation)

Figure 7:
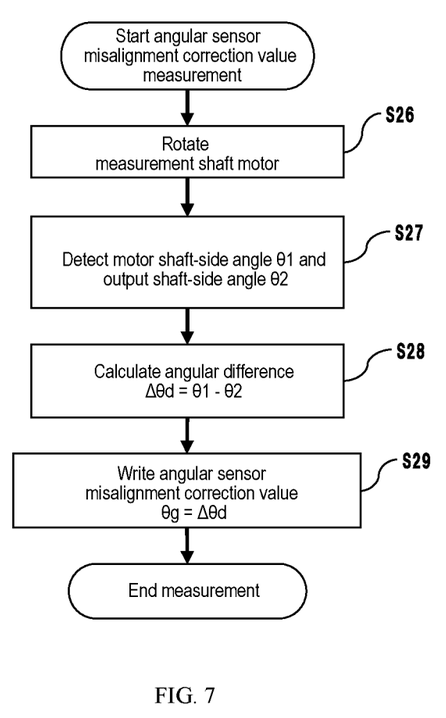
FIG. 7 is a flowchart illustrating method of angular sensor misalignment correction value measurement that is performed by the robot system according to the present invention.

FIG. 7
Start Angular Sensor Misalignment Correction Value Measurement
S26 Rotate measurement shaft motor
S27 Detect motor shaft-side angle θ1 and output shaft-side angle θ2
S28 Calculate angular difference $\Delta\theta d = \theta 1 - \theta 2$ S29 Write angular sensor misalignment correction value $\theta g = \Delta\theta d$ End Measurement

What is claimed is:
1. A robot system comprising:
a robot main body and a robot control unit,
the robot main body including:
a motor;
a deceleration device connected to a motor shaft of the motor;
an arm connected to an output shaft of the deceleration device;
a motor shaft-side angular sensor configured to detect an angle of rotation of the motor shaft of the motor; and
an output shaft-side angular sensor configured to detect an angle of rotation of the output shaft of the deceleration device, and the robot control unit being configured to detect a contact state between the arm or an instrument attached to the arm and another object, wherein the robot control unit includes;
- an angular sensor misalignment correction value storage unit in which an angular sensor misalignment correction value is stored, the angular sensor misalignment correction value being calculated based on an amount of misalignment when the motor shaft-side angular sensor and the output shaft-side angular sensor are attached;
- a motor shaft-side angle calculation unit configured to calculate a motor shaft-side angle based on the angle of rotation on the motor shaft side;
- an output shaft-side angle calculation unit configured to calculate an output shaft-side angle based on the angle of rotation on the output shaft side;
- a torsional deformation amount calculation unit configured to calculate an angular difference between the motor shaft-side angle and the output shaft-side angle, and correct the calculated angular difference using the angular sensor misalignment correction value to obtain a torsional deformation amount;
- a spring constant storage unit in which a spring constant of a region from the motor to the arm is stored;
- a contact determination threshold storage unit in which an allowable contact torque of the arm is stored; and
- a contact determination unit configured to calculate contact torque of the arm based on the torsional deformation amount and the spring constant stored in the spring constant storage unit, and detect the contact state when the calculated contact torque is larger than the allowable contact torque stored in the contact determination threshold storage unit.

2. The robot system according to claim 1, wherein the robot control unit further includes a motor control instruction unit configured to stop the motor if the contact state is sensed by the contact determination unit.

3. The robot system according to claim 2, wherein the robot control unit further includes:
- a contact response gain storage unit in which a gain of the arm that responds to the contact torque is stored; and
- a motor control instruction unit configured to drive the motor at a speed obtained by multiplying a difference between the contact torque and the allowable contact torque by the gain, if the contact state is sensed by the contact determination unit.

4. The robot system according to claim 1,
wherein the robot control unit further includes:
- a contact response gain storage unit in which a gain of the arm that responds to the contact torque is stored; and
- a motor control instruction unit configured to drive the motor at a speed obtained by multiplying a difference between the contact torque and the allowable contact torque by the gain, if the contact state is sensed by the contact determination unit.

* * * * *